Figure 1:
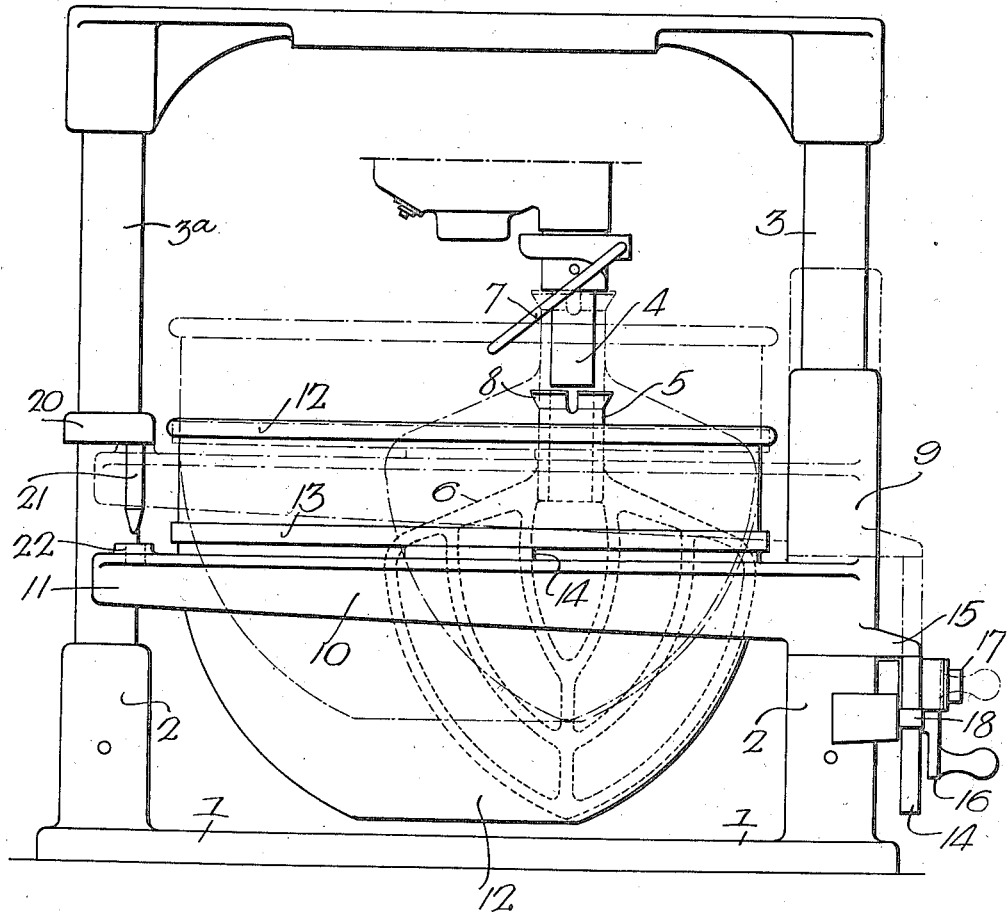

O. R. READ.
ATTACHMENT FOR MIXING MACHINES.
APPLICATION FILED FEB. 4, 1922.

1,438,856.

Patented Dec. 12, 1922.
3 SHEETS—SHEET 1.

Inventor.-
Otto Roland Read.
by his Attorneys.-
Howson & Howson

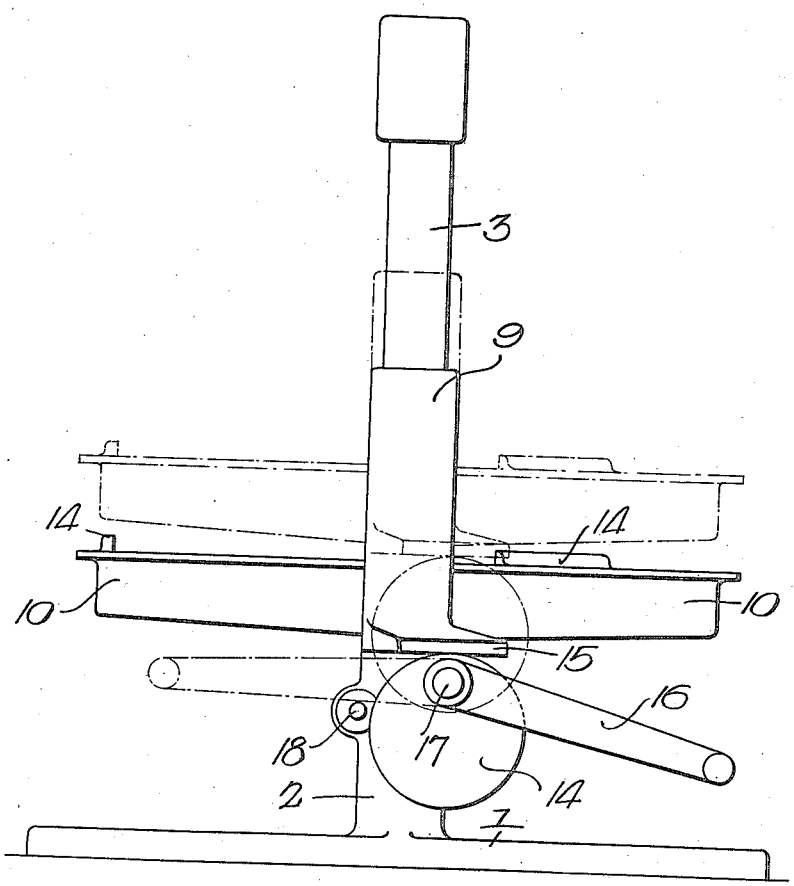

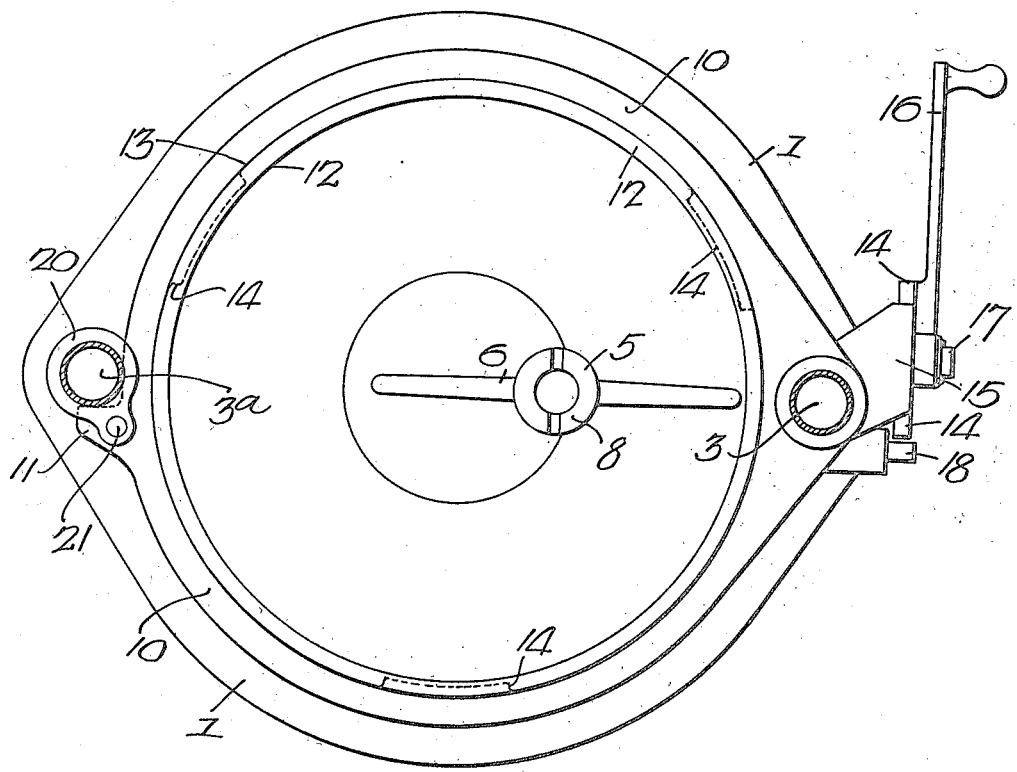

Patented Dec. 12, 1922.

1,438,856

UNITED STATES PATENT OFFICE.

OTTO ROLAND READ, OF YORK, PENNSYLVANIA, ASSIGNOR TO READ MACHINERY CO. INC., OF YORK, PENNSYLVANIA, A CORPORATION OF PENNSYLVANIA.

ATTACHMENT FOR MIXING MACHINES.

Application filed February 4, 1922. Serial No. 534,160.

*To all whom it may concern:*

Be it known that I, OTTO ROLAND READ, a citizen of the United States, residing in York, Pennsylvania, have invented Attachments for Mixing Machines, of which the following is a specification.

One object of this invention is to provide novel means for so supporting the bowl of a mixing or beating machine as to permit of its being conveniently and quickly lowered to bring it into a position allowing examination, replacement or removal of its contents or of the beater or of its being raised into a position in which said beater may properly operate on the contents of the bowl to mix or whip the same.

A further object of the invention is to provide relatively simple, compact and efficient means for raising and lowering the bowl of a mixing machine into or out of a position to cooperate with a beater or mixing element, and the invention also includes novel means for locking the bowl and its support in a raised position.

I also desire to provide a device of the character noted which shall include a bowl support capable of swinging laterally when in its lowered position to permit removal of the bowl, together with locking means which shall prevent such swinging when said support is in its raised position.

These objects and other advantageous ends I attain as hereinafter set forth, reference being had to the accompanying drawings, in which, Fig. 1 is a side elevation illustrating my invention as applied to a mixing machine;

Fig. 2 is an end elevation of the parts shown in Fig. 1, the bowl being removed;
and Fig. 3 is a plan partly in section of the device shown in Figs. 1 and 2.

In the above drawings 1 represents the base or lower portion of the frame of a well known form of mixing machine including two hollow bosses or sockets 2 formed at opposite sides for the reception of a pair of parallel vertically extending columns or standards 3, which at their upper parts support the motor and driving mechanism of the mixing machine. Since however these constitute no part of the present invention, they have all been omitted with the exception of a portion of the vertically extending beater shaft 4 whose lower end projects into and is detachably locked to the head or socket 5 of a beater or whip 6. While this latter may be attached to said shaft in any desired manner, I have shown it so connected as to be caused to rotate therewith by means of a spring clip or bail 7, which when swung upwardly on its pivot, disengages a flange 8 on the head 5 and permits said beater to be dropped or drawn off of the lower end of said shaft.

In order to properly support a bowl containing material to be beaten or mixed by the member 6, I provide on one of the columns 3 a sleeve 9 integrally or otherwise suitably fixed to a bowl holder, illustrated in the present instance as a ring-shaped structure 10 designed to fit between said columns 3—3. This holder includes a lug 11 projecting at a point substantially opposite the sleeve 9 so as to engage one of the columns when its bowl receiving opening is concentric with the vertical center line of the machine. This holder is designed to receive a bowl 12 containing material to be mixed or beaten and its upper portion is formed with a projecting flange 13 designed to rest upon lugs 14 projecting upwardly from the top face of said holder.

When the bowl with its holder 10 are in their lower positions, the sleeve 9 rests upon the upper end of one of the sockets 2 and the parts are so designed that the beater 6 is then sufficiently high above the bottom of the bowl to permit of its being easily moved off of the end of its driving shaft 4 after having been released therefrom by a proper manipulation of the clip 7. In order however that the beater may properly cooperate with the bowl to mix or beat the contents thereof, I provide means for raising it so that in the present case its wall is brought immediately adjacent the path of the beater, which rotates axially of the shaft 4 and also revolves with said shaft about the center line of the machine.

For this purpose I mount a disc or other suitable form of cam 14 eccentrically on the socket 2 immediately under the sleeve 9 and provide the lower end of this latter with a suitable portion such as a foot 15 designed to engage the edge of said cam. The latter has fixed to it a crank handle 16 whereby it may be rotated on its supporting spindle 17 and the parts are so arranged that the rotation of the cam from the position shown in full lines in Fig. 2 to that shown in dotted lines will cause said cam to slide the sleeve 9 upwardly on its column 3, thereby raising the holder 10 into such a position that the bowl is brought into proper cooperative relation with the beater 6. Adjacent the cam 14 I provide a post 18 projecting from the structure 2, so that after the cam has been turned through an arc of slightly more than 180°, it will pass into such a position that the weight of the holder with the bowl, etc., tending to return it to the position shown in full lines, is resisted by said post 18 against which the cam will rest.

It is noted that in addition to being vertically movable on the standard or column 3, the sleeve 9 with the holder 10 and the bowl may be swung outwardly upon said column as a spindle after the beater has been removed, in order to permit of the convenient removal of the contents of the bowl or of the bowl itself from the holder. In order to prevent its outward swinging when the bowl is in its raised position and also to hold the parts immovable during the operation of the beater, I mount a collar 20 on the column 3 and provide it with a downwardly projecting locking pin 21 designed to enter a suitable hole or recess 22 in the lug 11, when the holder 10 is in its raised position. This effectually prevents lateral movement of the parts and holds them rigid during the operation of the beater. Said pin 21 is obviously of such a length as to be disengaged by the lug 11 when the holder and bowl are in their lower positions so that they may then be swung on the column 3 as described.

I claim:

1. The combination in a mixing machine of a rotary beater; a standard; a bowl holder mounted to rotate and also slide on said standard; a mechanical device for moving the holder vertically on the standard to bring a bowl carried thereby into position to cooperate with the beater; and means for locking said holder from rotation when it is in its raised position.

2. The combination in a mixing machine of a beater; a bowl holder mounted to move vertically toward and from the beater; and a cam operative on the holder to raise it into position to permit the beater to cooperate with the bowl.

3. The combination in a mixing machine of a beater; a standard therefor; a sleeve mounted to slide on the standard and having a projecting portion constituting a bowl holder; a cam operative on the sleeve; means for rotating the cam to move the sleeve vertically on the standard at will; and a device for preventing rotation of the sleeve on the standard when it has been raised to a predetermined position.

4. The combination in a mixing machine of a beater; two standards; a bowl holder rotatably mounted on one standard and slidable vertically thereon; a locking member on the other standard; and means for raising the bowl holder in position to engage the locking member and cooperate with the beater.

5. The combination in a mixing machine of a frame including a standard; a beater; a sleeve slidable on the frame; a ring carried by the sleeve and constituting the bowl holder; a cam rotatably mounted on the frame; and means for turning the cam to cause it to move the sleeve with the bowl holder into position to cooperate with the beater.

6. The combination in a mixing machine of a beater shaft; a beater mounted on the lower end of said shaft; a bowl holder mounted to swing in a horizontal plane; a mechanical device for moving the holder from a position in which a bowl therein operatively cooperates with the beater, into a position in which the beater may be removed from the shaft; and means for preventing swinging of the bowl holder when it has been moved into position to permit the bowl to cooperate with the beater.

7. The combination in a mixing machine of a beater; a vertically movable bowl holder; a bowl in said holder; a cam for moving said holder to bring the bowl into and out of a position in which it operatively cooperates with the beater; means for turning the cam; and means for retaining the cam in a position to hold the bowl raised.

8. The combination in a mixing machine of a vertical shaft; a beater on the shaft removable therefrom by a downward movement; a pair of vertical columns; a bowl holder mounted to swing horizontally on one of said columns and including a portion positioned to cooperate with the other column to limit the swinging movement; means for lowering the holder with a bowl therein to permit removal of the beater from the shaft; and a pin on the second column positioned to lock the bowl holder from swinging when the bowl therein is in position to cooperate with the beater.

9. The combination in a mixing machine of a vertical shaft; a beater on the shaft and removable therefrom by a downward movement; a bowl holder; a bowl carried by said holder in position to operatively cooperate with the beater and capable of being swung horizontally; means for lowering the holder with the bowl to permit removal of the beater from its shaft; and means for locking said holder with the bowl in its elevated position.

OTTO ROLAND READ.